(12) United States Patent
Wipasuramonton et al.

(10) Patent No.: US 6,270,113 B1
(45) Date of Patent: Aug. 7, 2001

(54) SIDE AIR BAG SYSTEM

(75) Inventors: Pongdet P. Wipasuramonton, Rochester; Robert Tobian, New Baltimore; David L. Dominissini, Allen Park; Bonnie Y. Cheung, Auburn Hills, all of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/245,247

(22) Filed: Feb. 5, 1999

Related U.S. Application Data

(63) Continuation-in-part of application No. 09/167,015, filed on Oct. 6, 1998.

(51) Int. Cl.$^7$ ................................................ B60R 21/22
(52) U.S. Cl. ................................. 280/730.2; 280/730.1; 280/728.1
(58) Field of Search .......................... 280/728.2, 730.2, 280/730.1, 728.1, 729, 740, 743.1

(56) References Cited

U.S. PATENT DOCUMENTS

| | | |
|---|---|---|
| 3,618,981 | 11/1971 | Leising et al. . |
| 3,799,575 | 3/1974 | Kurze et al. . |
| 3,836,169 | 9/1974 | Schiesterl . |
| 4,265,468 | 5/1981 | Suszko et al. . |
| 4,290,627 | 9/1981 | Cumming et al. . |
| 5,172,933 | * 12/1992 | Strasser ................................. 280/740 |
| 5,372,381 | 12/1994 | Herridge . |
| 5,573,270 | 11/1996 | Sogi et al. . |
| 5,586,782 | * 12/1996 | Zimmerman, II et al. ........ 280/730.2 |
| 5,632,506 | 5/1997 | Shellabarger . |
| 5,791,685 | * 8/1998 | Lachat et al. ..................... 280/743.1 |
| 5,845,935 | 12/1998 | Enders et al. . |
| 5,848,804 | * 12/1998 | White, Jr. et al. ................ 280/743.1 |
| 5,853,191 | 12/1998 | Lachat . |
| 5,895,070 | * 4/1999 | Lachat ............................... 280/730.2 |
| 5,899,490 | 5/1999 | Wipasuramonton et al. . |
| 5,918,902 | 7/1999 | Acker et al. . |
| 5,944,342 | * 8/1999 | White, Jr. et al. .................. 280/729 |
| 6,019,387 | * 2/2000 | Jost .................................. 280/730.2 |

FOREIGN PATENT DOCUMENTS

| | | |
|---|---|---|
| 0 847 904 A1 | 6/1998 | (EP) . |
| 2 753 665 A | 3/1998 | (FR) . |
| WO 99/10207 | 3/1999 | (WO) . |

* cited by examiner

*Primary Examiner*—Paul N. Dickson
*Assistant Examiner*—Faye M. Fleming
(74) *Attorney, Agent, or Firm*—Markell Seitzman

(57) ABSTRACT

A side impact or rollover air bag for protecting a vehicle occupant during an accident, comprising:

an inflatable cushion which upon inflation is positioned between the occupant and an adjacent portion of a vehicle to protect the occupant, the cushion including first and second sides, a top and bottom;

inflatable tube, positioned adjacent the cushion, for extending the cushion to its full vertical length prior to the full forward inflation of the cushion by inflation gas.

14 Claims, 7 Drawing Sheets

SIDE AIR BAG SYSTEM

This application is a continuation in-part of co-pending Ser. No. 09/167,015, filed Oct. 6, 1998.

BACKGROUND AND SUMMARY OF THE INVENTION

The invention generally relates to vehicular safety restraint systems and more particularly to one which can protect an occupant during a side impact vehicle collision.

Over the last few years, a number of inventions dealing with side impact air bag systems have been proposed. Each of these systems comprises an inflator and an air bag. The air bag is installed prior to inflation in a compact folded or rolled condition. Upon sensing the occurrence of a side impact collision via various sensors, such as a crush sensor or accelerometer mounted to the side structure of the vehicle, a control signal is generated causing the inflator to be activated, thereby producing or releasing inflation gas. This inflation gas causes the air bag to inflate. Ideally, the side impact air bag must be positioned between the side of the occupant and an adjacent side of the vehicle to adequately protect the occupant. In addition, during the operation of the vehicle many occupants, especially small children, may be positioned in an out-of-normal-seating position which has been referred to as out-of-position (OOP). As an example, one such out-of-position seating orientation might include a child resting within the corner formed by the outer edge of the seat and the adjacent side of the vehicle. The inflating side impact air bag must not adversely react with this out-of-position occupant.

It is a purpose of the present invention to provide an improved air bag system. A further object of the present invention is to provide an air bag which, after breaking free of the seat, extends generally upwardly, as in the case of a telescoping pole, behind the occupant and which permits the remaining portion of the air bag or cushion to unfurl forwardly, as would be the case with a flag.

Accordingly the invention comprises a side impact or rollover air bag for protecting a vehicle occupant during an accident, comprising: an inflatable cushion which upon inflation is positioned between the occupant and an adjacent portion of a vehicle to protect the occupant, the cushion including first and second sides, a top and bottom; inflatable tubular means, positioned adjacent the cushion, for extending a portion of the cushion vertically prior to the full forward inflation of the cushion by inflation gas. The air bag also includes an inlet for receiving the inflation gas and passages for communicating the inflation gas to the cushion portion of the air bag.

Many other objects and purposes of the invention will be clear from the following detailed description of the drawings.

DETAILED DESCRIPTION OF THE DRAWINGS

Figure 1:
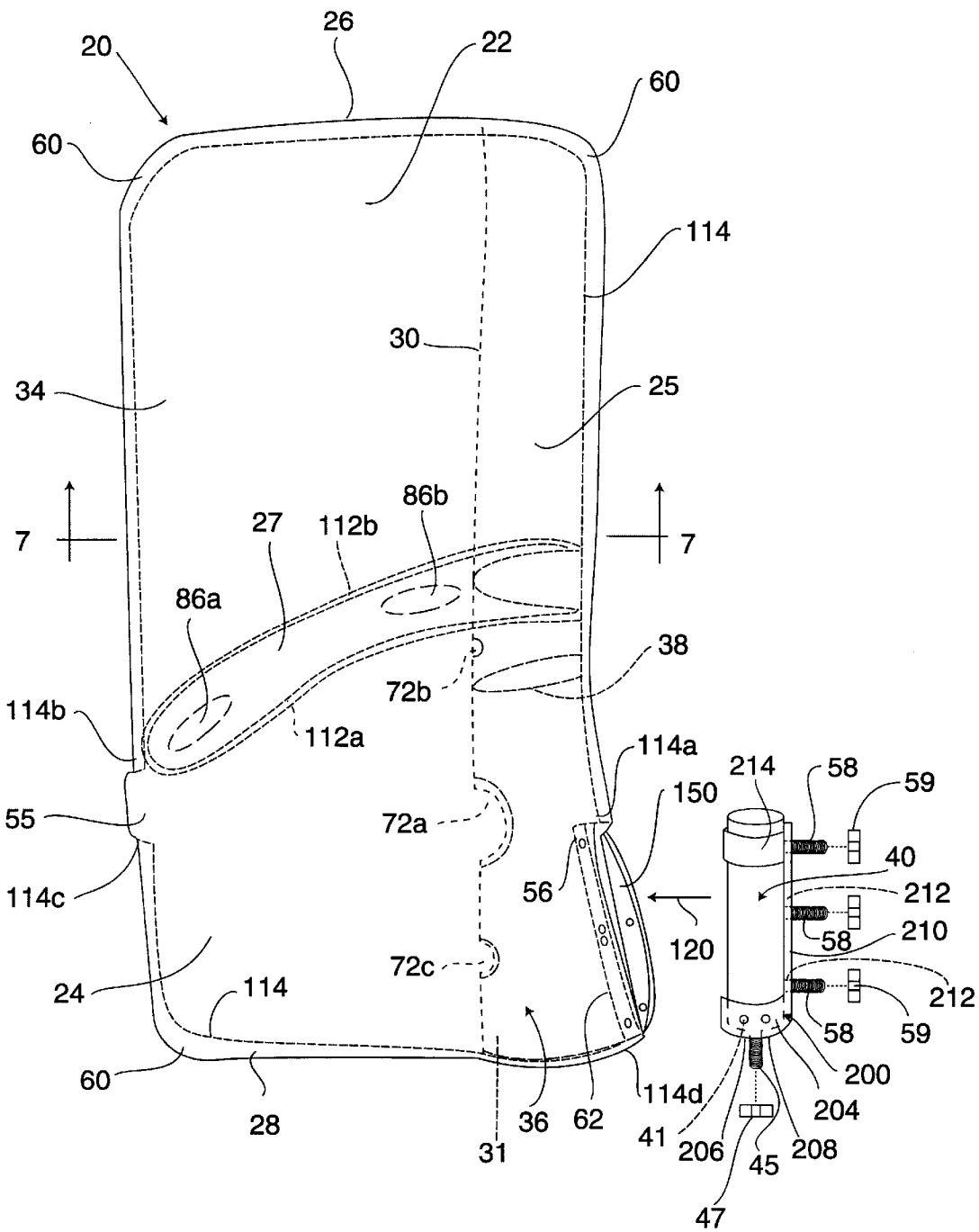
FIG. 1 shows a side view of a side impact air bag incorporating the features of the present invention.

FIG. 1 illustrates a plan view of a multi-chambered air bag 20 having an upper or head chamber 22, a lower or thorax chamber 24. The two chambers 22 and 24 are separated by a separator panel 27. The air bag 20 includes a third or rear chamber 25 which generally extends substantially from the top 26 to the bottom 28 of the air bag 20 and is formed by a tube panel 30 forming a tube 36. The combined head and thorax chambers are also referred to as a cushion or cushion portion 34 of the air bag 20. An inflator 40 is positioned within the lower portion of the tube. An additional, optional panel 38 is sewn to the lower part 31 of the tube 30 and functions as a heat shield.

Figure 2:
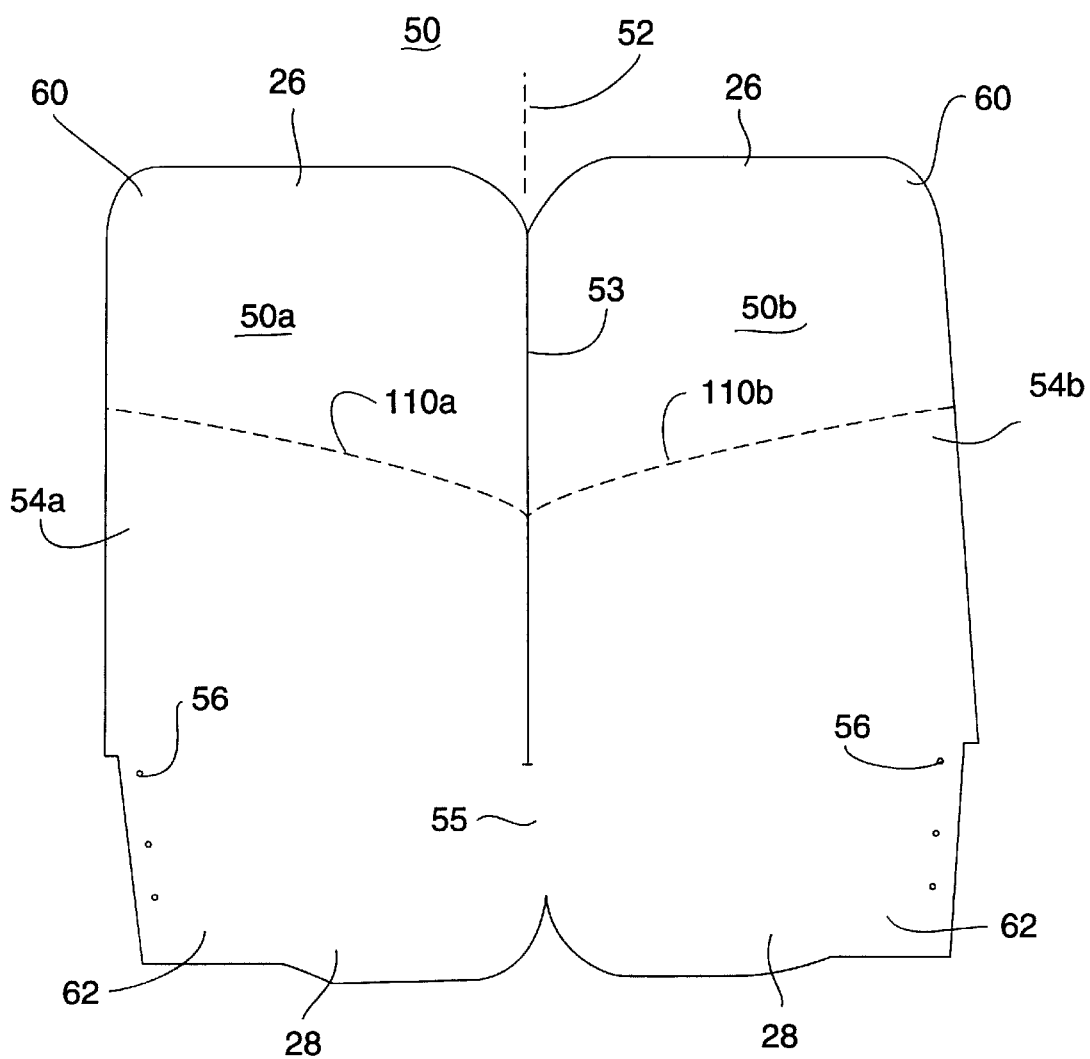
FIG. 2 illustrates a plan view of the main panel of the air bag of FIG. 1.
Figure 7:
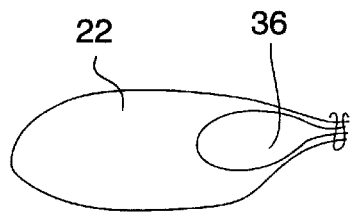
FIG. 7 shows a cross-sectional view through section 7—7 of FIG. 1.

Reference is made to FIG. 2 which illustrates the features of a main panel 50 which forms the cushion 34. The main panel 50 includes side panel portions 50a and 50b which are generally symmetrical about a centerline 52. While two separate side panels can be used to form the air bag, the main panel 50 of the present invention includes a large slit 53 that partially extends down the centerline and separates the main panel into the panel portions 50a and 50b. The two panel portions are joined at a shared or common section 55 of the main panel 50. Each side panel portion 50a and 50b includes a top 26 and a bottom 28. Panel 50a includes an outer side 54a, while panel side 50b includes an outer side 54b. Each of the panel sides 50a and 50b includes a plurality of openings 56 which, in the preferred embodiment, are placed about corresponding studs 58 of the inflator 40 (see FIG. 1). As can be seen, these stud openings 56 are located in the lower outside corners 62 of each of the panel portions 50a and 50b respectively. These corners are generally perpendicular in shape. The other corners 60 of the panels 50a and 50b are curved (see FIG. 2).

Figure 4:
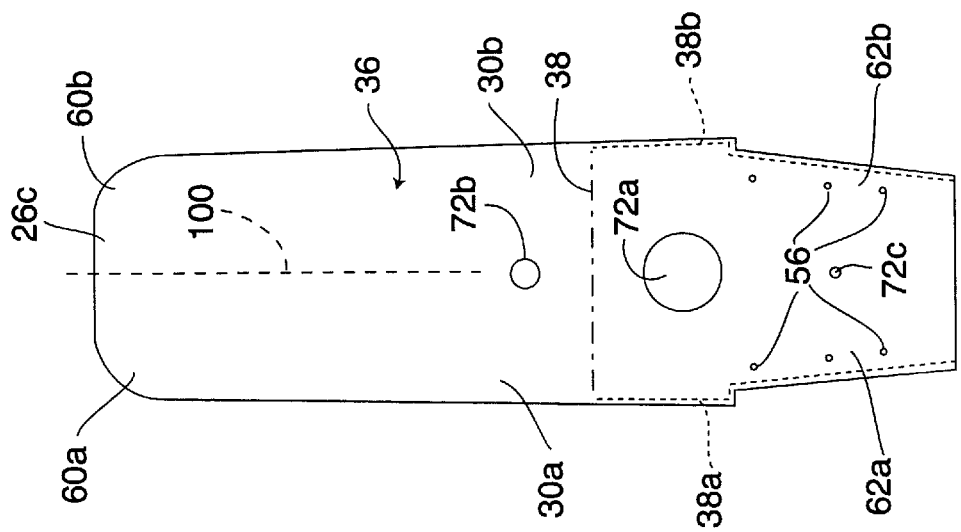
FIG. 4 illustrates a tube panel.
Figure 5:
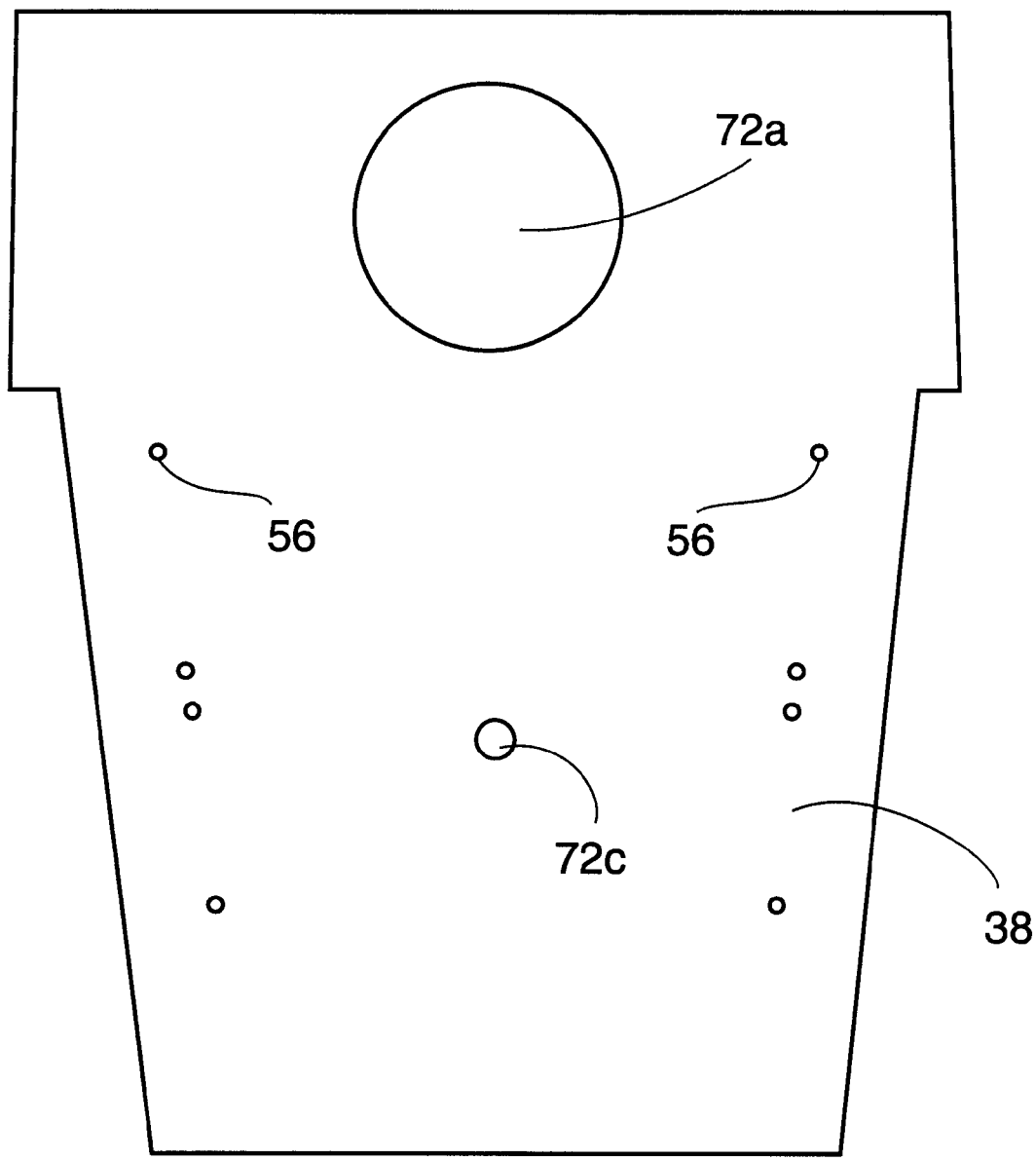
FIG. 5 illustrates a tube reinforcement panel.

FIG. 4 illustrates a plan view of the tube panel 30 laid flat about its centerline 100. The panel 30 includes sides 30a and 30b, a top 26c and top, curved corners 60a and 60b (similar in shape to top corners 60). The lower sides 62a and 62b of the tube panel 30 are shaped to conform with the shape of the lower outer corners 62 of the main panel 50. The tube panel 30 additionally includes a plurality of mounting holes 56 similar in number and location to those holes in the main panel 50. Additionally, the tube includes a plurality of vent holes 72a–c which are used to communicate inflation gas to the lower portion of the cushion 34. As illustrated in FIGS. 1 and 4, the tube panel includes a large central vent 72a, a smaller, upper vent 72b and a lower vent 72c. The sides of these vents or vent openings are 76 mm, 25 mm and 10 mm respectively. Reference is briefly made to FIG. 5 which is a plan view of the additional panel 38. This panel is identical in shape to the lower portion of the tube panel 30 and includes vent holes 72a and 72c and a plurality of stud openings or holes 56. During assembly, the panel 38 is placed upon the lower portion 31 of the tube panel 30. This orientation is shown in FIG. 4 with the panel 38 shown in phantom line. Thereupon the panel 38 is sewn to the tube panel along peripheral seams 38a and 38b.

Figure 3:
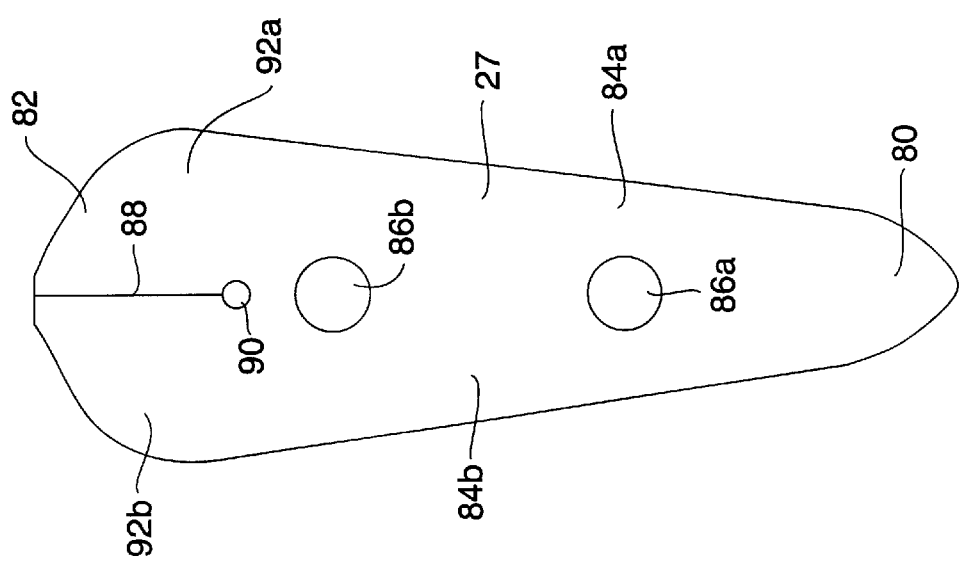
FIG. 3 illustrates a cushion separator panel.

As mentioned above, the air bag 20 includes a separator panel 26 which is shown in isolation in FIG. 3. The separator panel 27 is oblong in shape having a narrow, curved forward end 80, a wider and larger curved rear end 82 and sides 84a and 84b. The separator panel includes two vent holes 86a and 86b. The end 82 is separated using a slit 88 which terminates at a stress-relieving circle 90. The slit 88 separates the end of the separator panel into wings 92a and 92b.

Figure 6:
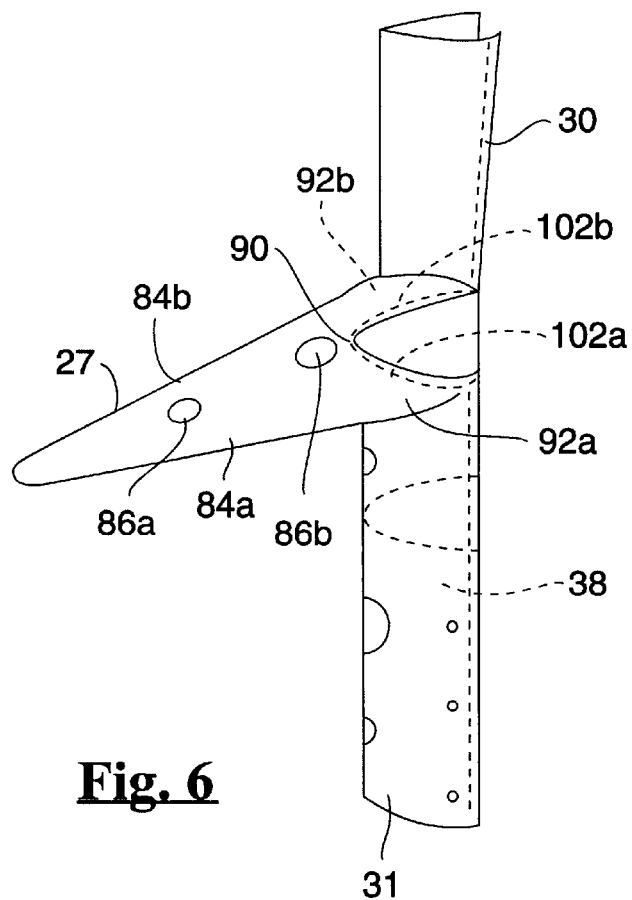
FIG. 6 illustrates a partially constructed air bag.

During assembly, the separator panel 27 is secured to the tube panel 30. The separator panel is positioned relative to the tube panel 30 such that opening 90 is located on the centerline 100 of the tube panel 30. Thereafter, wing 92a is sewn to the tube panel 30 along a line of stitches 102a. Similarly, wing 92b is sewn to the other half of the tube panel 30 along a line of stitches shown as 102b. FIG. 6 illustrates the separator panel 27 secured to the tube panel 30. The heat shield panel 38 is now also secured to the lower portion 31 of the tube panel 30 as shown in FIG. 6.

The separator panel 27 and the tube panel 30 are now secured to the main panel 50. This is achieved, for example, by aligning side 84b of the separator panel to its desired orientation (relative to the main panel 50) shown by dotted line 110 (see FIG. 2). Thereafter, side 84b of the separator panel is sewn to the side 50b of the main panel 50 along sew line 112b. Subsequently, side 84a is positioned next to side 50a of the main panel along its desired orientation (shown by dotted line 110a) and the side 84a of the separator panel 27 is sewn to the side panel 50a along sew line 112a. Reference is again made to FIG. 1 which shows the sew lines 112a and 112b used to sew the separator panel 27 to the main panel 50. Thereafter, the main panel 52 is folded about its centerline 52 and the tube panel folded about its centerline 100. This operation overlays and aligns sides 30a and 30b of the tube panel with sides 50a and 50b of the main, panel. This alignment generally achieves the configuration shown in FIG. 1. Thereafter, the main panel 50 and the tube panel 30 are sewn together along a peripheral sew line 114 starting at point 114a and terminating at point 114b just above the connecting or common portion 55 which links the panel portion or sides 50a and 50b. The peripheral sew line continues on the lower end of portion 55 at point 114c and terminates at point 114d near the mounting holes 56. As can be seen, the completed air bag includes the above-mentioned upper chamber 22 and lower chamber 24 separated by the separator panel 22 and tube panel 30 extends from the top 26 to the bottom 28 of the air bag 20. Since seam 114 does not extend generally across that portion of the bag 20 near the mounting holes 56 a doorway or opening 150 is defined into which the inflator 40 is inserted onto the lower end of the tube and main panel. In the illustrated embodiment the tube 36 by virtue of the seam 114 is closed at its top. The inflator 40 is positioned within the opening 150 formed by the opposed lower corners 62 of the main panel (tube panel 30 and panel 38). FIG. 1 illustrates arrow 120 to show the line of movement of the inflator within the opening 150 of the air bag. Thereafter, one set of mounting openings 56 at one of the lower corners 62 is fitted about a corresponding stud 58. Thereafter, the opposite corner 62 of the lower portion of side 50b with the other openings 56 is moved over the lower portion of the side 50a permitting the mounting studs 58 enter therein to achieve an overlapping relationship. Thereafter, the lower end 62 of each of the sides 50a and 50b, proximate the opening 150 may be held in place, on the inflator 40, by securing a threaded fastener such as nut 59 about each of the threaded studs 58. The tube panel 30 (and the optional panel 38) can be secured to the main panel in a number of ways. Rather than using a single sewn seam 114 respective sides of the tube panel can be first secured to a corresponding side of the main panel. Thereafter, these common sides can be joined together to achieve the desired orientation.

The inflator 40 can be first secured to a mounting retainer 200 which includes at one end an open sided cradle 204 with an opening 206 in an end wall end 208. The retainer 200 includes a thin support bar 210 extending from and integrally formed as part of the cradle 204. The bar includes a plurality of mounting openings 212 through which the mounting studs extend. The inflator 40 can comprise a thin, hollow, cylindrical tube having at one end at least one gas exit port 41. As is known in the art, inflators can be manufactured using a chemical propellant which, when heated, produces inflation gas or, part of the inflator can be fashioned as a pressure vessel in which an inert gas is stored under pressure. This gas is subsequently heated causing one or more burst disks to open communicating the inflation gas to at least one exit port situated at the lower extreme of the inflator. The inflator may have the mounting studs 58 extend from the body of the inflator. The inflator is installed in the retainer 200. The inflator 40 includes a threaded stud 45 that is received within the opening 206 of the cradle 204 and secured therein by a nut 47. The opposite end of the inflator 40 may be secured to the bar 210 by a circular strap 214.

Figure 8:
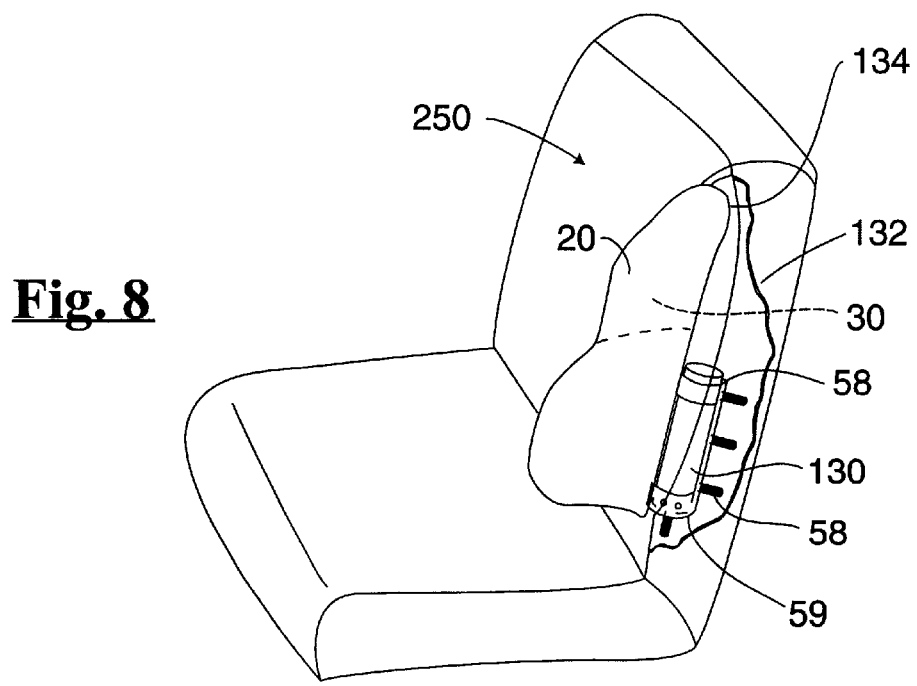
FIG. 8 shows the partially inflated air bag 22 emanating from the vehicle seat.

Reference is briefly made to FIG. 8 which shows the air bag 20 in a partially inflated condition as it emanates from a vehicle seat 250.

The mounting studs 58 of the inflator are secured to a frame 130 of the seat by the fasteners 59. Prior to activation of the inflator 40, the air bag 20 is folded or rolled into a compact configuration about the inflator 40 within the seat back and covered by the foam and exterior covering material of the seat.

The inflator may be secured directly to the mounting frame 130 of the vehicle seat 132 or installed within a housing such as retainer 200. The air bag is situated behind an outboard seam 134 of the seat 250 such that upon inflation of the air bag, the inflating air bag 20 bursts through the seam 134. As the air bag continues to inflate the air bag 20 is positioned between the side of the occupant and the adjacent side of the vehicle.

In the present invention, inflation gas is communicated first to the tube 36 causing the tube to completely inflate prior to the inflation of the lower chamber 24 or upper chamber 22. As inflation gas is communicated to the tube, the tube causes the air bag to unfold and the tube will be positioned generally in an upright orientation as illustrated in FIG. 8 to properly orient the air bag behind the outboard shoulder of the occupant. By virtue of the flow orifices 72a–72c, inflation gas is simultaneously communicated to the lower chamber 24 causing the lower chamber 24 to extend outwardly from the upright tube 36 albeit at a lower rate defined by the size of the orifices 72a–c. Inflation gas enters the upper chamber 22 through the flow openings 86a and 86b in the separator panel 27.

Figure 9:
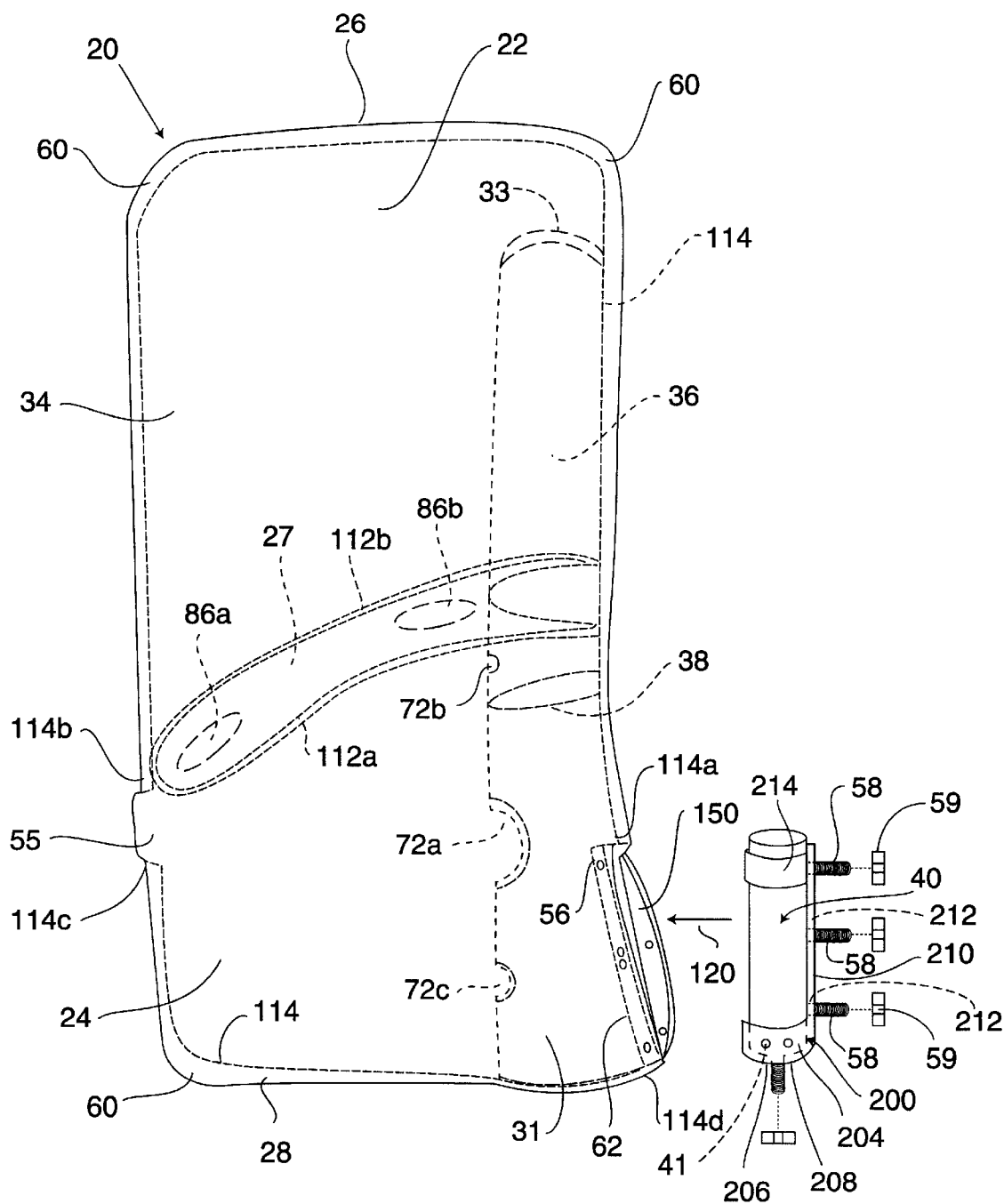
FIG. 9 shows an alternate embodiment of the invention.

Reference is made to FIG. 9 which shows an alternate embodiment of the invention. This embodiment is identical to that of FIG. 1 with the exception that the tube panel 30 is foreshortened. As can be seen the tube end 33 is closed (such as by sewing or inserting a patch of material). In this embodiment the upper chamber 22 extends rearwardly about the top of the tube.

Figure 10:
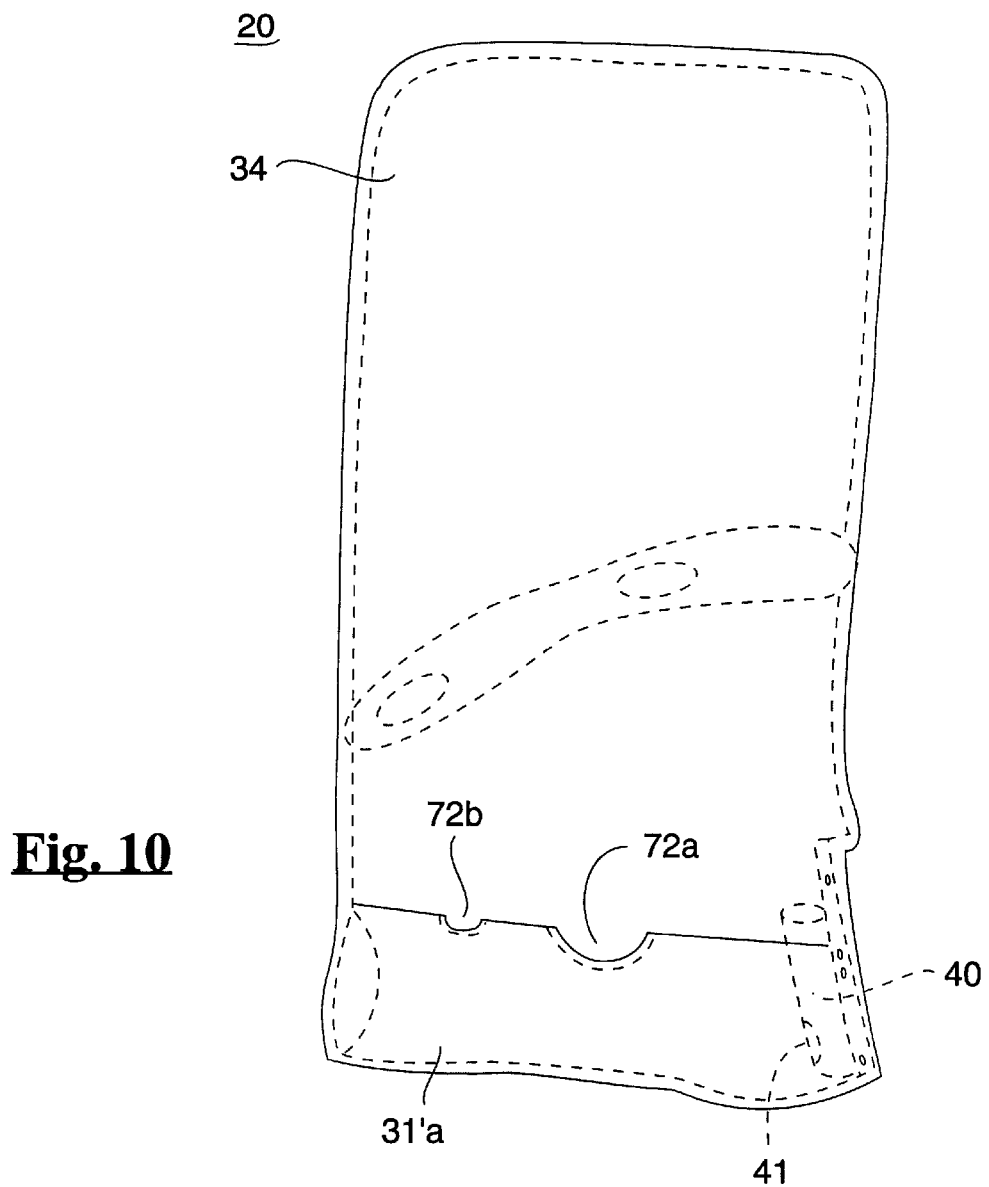
FIGS. 10 and 11 show a further alternate embodiment of the invention.
Figure 11:
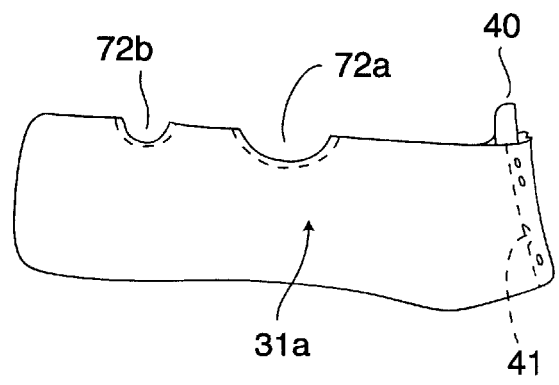

FIGS. 10 and 11 show a multi-chambered air bag 20 with a tube 31a positioned along a lower edge 28 of the lower chamber 24. FIG. 11 shows the tube 31a in isolation and also diagrammatically illustrates the inflator 40 in the right hand side of the tube 31a. As can be appreciated the exit port or ports 41 are located in the inflator 40 to direct gas into the tube 31a. The tube also includes ports or openings 72a and 72b through which inflation gas enters into the lower chamber 24.

It should be appreciated that the tube can be used with a single as well as multi-chambered air bag. The tube can be enclosed by common seam such as 114 as shown above or fabricated as a three-dimensional tube loosely inserted within the cushion and secured near corners 62.

Many changes and modifications in the above-described embodiment of the invention can, of course, be carried out without departing from the scope thereof. Accordingly, that scope is intended to be limited only by the scope of the appended claims.

What is claimed is:

1. A side impact or rollover apparatus for protecting a vehicle occupant during an accident, comprising:

an inflatable air bag stored in a deflated condition and when inflated positioned between a vehicle occupant and a side of the vehicle; the air bag comprising a first side panel and a second side panel, a tube panel and a separator panel;

the first and second side panels joined together to form the exterior of the air bag, rear edges of the first and the second side panels are secured together to form a rear of the air bag and bottom edges of the first and second panels are secured together to form a bottom of the air bag;

wherein sides of the tube panel are secured to a corresponding portion of the first and second panels to form a tube which extends upwards generally from the bottom of the air bag along the rear of the air bag, a lower portion of the tube being open to receive an inflator which communicates inflation gas to the lower portions of the tube; and wherein the separator panel is secured to the first and second panels and to the tube panel to segment these portions of the air bag, forward of the tube, into an upper chamber and into a lower chamber.

2. The apparatus as defined in claim 1 wherein the tube extends from the bottom of the air bag to a top of the air bag and the upper chamber and the lower chamber extend forward from the tube.

3. The apparatus as defined in claim 1 wherein a top of the tube is spaced from a top of the air bag and wherein the upper chamber extends into a void between the tube and the top of the air bag.

4. The apparatus as defined in claim 1 wherein a lower portion of the rear of the air bag is open and the inflator is received in this lower portion of the air bag adjacent a lower portion of the tube.

5. The apparatus as defined in claim 4 wherein the inflator is cylindrical in shape and arranged so that its longitudinal axis is parallel to a longitudinal axis of the tube.

6. The apparatus as defined in claim 4 wherein the inflator is cylindrical and has a known length and wherein the length of the tube from its bottom to its top is substantially greater than the length of the inflator.

7. The apparatus as defined in claim 1 wherein as the air bag is inflating, the lower portion of the tube, proximate the inflator, is spaced apart from the inflator.

8. A side impact or rollover air bag apparatus for protecting a vehicle occupant during an accident, the apparatus comprising:

an inflatable air bag;

an inflator operatively connected to the air bag for inflating the air bag;

mounting means for mounting the inflator generally vertically relative to a seat back of a vehicle seat and for mounting the air bag within the vehicle seat;

wherein prior to inflation the air bag is stored in a deflated state within the vehicle seat and upon inflation the air bag extends substantially upwards from its mounting location in the seat and from the inflator, and wherein during inflation the air bag also extends forward of its mounting location and is positioned between a side of the occupant to be protected and an interior side of the vehicle;

the air bag includes front and rear portions, a top and bottom and an inner side and an outer side, the inner side and the outer side formed by a respective inner panel and an outer panel; the air bag further includes an internal tube positioned adjacent the rear portion, the inflator is received within a lower portion of the tube and supplies inflation gas directly into the tube, the tube, when inflated, is substantially longer than the length of the inflator, the tube by virtue of its direct communication with the inflator inflating generally vertically upward from the mounting location to a fully inflated condition prior to full inflation of other portions of the air bag;

the air bag further including a separator means, located in front of the tube, for separating the air bag into a lower chamber and an upper chamber, wherein rear portions of the lower and upper chambers are formed by a corresponding part of tube.

9. The apparatus as defined in claim 8 wherein a top of the tube is open and communicated to an adjacent portion of the upper chamber.

10. The apparatus as defined in claim 9 wherein the tube includes openings along its length to communicate inflation gas to the upper and lower chambers.

11. The apparatus as defined in claim 8 wherein the separator means includes a panel having a rear part secured to the tube and having first and second sides each respectively connected to one of the inner panel and outer panel of the air bag.

12. The apparatus as defined in claim 8 wherein a top of the tube is closed.

13. The apparatus as defined in claim 8 wherein a top of the tube extends to the top of the air bag and is closed at the top of the air bag.

14. A side impact or rollover air bag apparatus for protecting a vehicle occupant during an accident, the apparatus comprising:

an inflatable air bag, an inflator operatively connected to the air bag for inflating the air bag;

mounting means for mounting the inflator generally vertically relative to a seat back and for mounting the air bag within a vehicle seat;

prior to inflation the air bag is stored in a deflated state within the vehicle seat and upon inflation the air bag extends substantially upwards from its mounting location in the seat and from the inflator, further during inflation the air bag also extends forward of its mounting location and is positioned between a side of the occupant to be protected and an interior side of the vehicle;

the air bag includes a tubular chamber which extends along a rear edge of the air bag and arranged to receive inflation gas from the inflator prior to any other inflatable portion of the air bag, wherein on receipt of inflation gas the tubular chamber fills with inflation gas and extends generally upward from the mounting location of the inflator thereby positioning the rear of the air bag relative to the seat;

the air bag further includes an upper chamber and a lower chamber each of which is positioned forward of the tubular chamber and fluidly connected to the tubular chamber such that inflation gas flows from the tubular chamber into the upper and into the lower chambers.

* * * * *